United States Patent

Schwartz

[15] 3,676,843
[45] July 11, 1972

[54] DIRECTIONAL AND PITCH TRIM INDICATOR FOR AUTOMATIC PILOTS

[72] Inventor: Karlhans Schwartz, Owingen, Germany

[73] Assignee: Bodenseewerk Gergtetechnik GmbH, Uberlingen/Bodensee, Germany

[22] Filed: April 27, 1970

[21] Appl. No.: 32,068

[30] Foreign Application Priority Data

April 30, 1969 Germany......................P 19 22 076.9

[52] U.S. Cl. .........................................................340/27 R
[51] Int. Cl. .......................................................B64c 13/18
[58] Field of Search....................340/27 R, 25, 26; 244/27 D, 244/27 F; 33/200 DL

[56] References Cited

UNITED STATES PATENTS 3,322,939   5/1967   Curties et al.............................340/27

FOREIGN PATENTS OR APPLICATIONS 354,444   8/1931   Great Britain.....................33/206 DL

*Primary Examiner*—Kathleen H. Claffy
*Assistant Examiner*—Thomas L. Kundert
*Attorney*—Darbo, Robertson & Vanderburgh

[57] ABSTRACT

Four lights are positioned in a square. When a directional correctional signal from an autopilot exists for a predetermined length of time and is above a given magnitude, lights at one or the other sides of the square are lighted to indicate that face and the direction involved. When a pitch correctional signal from the autopilot exists for a predetermined length of time and is above a given magnitude, lights at one or the other ends of the square are lighted to indicate that fact and the particular pitch involved.

2 Claims, 2 Drawing Figures

Patented July 11, 1972  3,676,843

INVENTOR
KARLHANS SCHWARZ
BY
Darbo, Robertson &
Vandenburgh

DIRECTIONAL AND PITCH TRIM INDICATOR FOR AUTOMATIC PILOTS

BACKGROUND AND SUMMARY OF THE INVENTION

Every automatic pilot should include an indicator to exhibit the average basic power consumed by the servomotor for the control surfaces over a given period. This specification is binding for the pitch channel, while for the directional channel an indication would be desirable. The purpose of this indication is to recognize mistrimmings in time, and that is, on the one hand, for not restricting the dynamic operating range of the servomotor for the control surfaces and, on the other hand, for avoiding dangerous flight conditions which might arise due to sudden disengagement of the automatic pilot when a mistrimming situation existed.

It is the primary purpose of the control surfaces to stabilize the flight attitude with respect to temporary disturbances. If by mistrimmings, such as by an unfavorable weight distribution with respect to the aircraft point of gravity or by nonuniform performances of the engines, a continuous torque is applied to the aircraft which must be counteracted by a corresponding continuous deflection of the control surfaces, then, it is possible that the respective control surface has already been deflected to such an extent that insufficient regulating distance is any longer available for compensating dynamic disturbances. At any rate, the human pilot must be informed in time of such mistrimmings. Another danger is that upon the automatic pilot being disengaged, the human pilot is not prepared for the deflections of the control surfaces required for compensating mistrimmings so that under certain circumstances he will react in the wrong manner and dangerous flight conditions may be caused. It is known for the trim indication to use indicating instruments having electric measuring devices which are relatively large and expensive. A mistrimming is then recognizable as a pointer deflection.

The present invention provides a noncomplex, inexpensive and space-saving trim indication for pitch and directional channels of an automatic pilot. This is attained in that the indication is provided by four indicator lamps which have applied thereto control signals of the control surfaces through a diode logic. Such indicator lamps make it possible in a simple manner to cause the presence and direction of mistrimmings in two senses to become recognizable. Four such indicator lamps with the associated circuit elements are simple and inexpensive and can be accommodated in a relatively small apparatus.

It is another object of this invention to provide a trim indicator of the type indicated with four indicator lamps in such a manner that the manner and direction of the mistrimming is recognizable at a glance and without any doubt. This is attained in that the indicator lamps are arranged in the four corners of a square and the diode logic is designed so that with a directional mistrimming the two lamps at the ends of one respective side of two opposite square sides light up, and with a pitch mistrimming the two lamps at the ends of one respective square side of the two remaining square sides light up.

Thus, at least two respective lamps light up, and that is, with a directional mistrimming two lamps disposed vertically one beneath the other, and with a pitch mistrimming two lamps disposed horizontally one beside the other. With simultaneous directional and pitch mistrimmings, three lamps light up which, by way of example, illuminate the right upper corner of the indicating field which is clearly recognizable. Recognition may be enhanced by suitable masks in front of these indicator lamps, for instance, with a ring-shaped aperture. The human pilot will then observe a "half-moon" opening rightwardly or leftwardly or towards the right downwardly.

The indicator lamps are energized by the control signals of the control surfaces through delay elements or elements having a threshold value as well as a diode combination. The delay elements and the elements having a threshold value ensure that the lamps will not be switched on by temporary movements of the control surfaces as they occur in the normal flight attitude stabilization. With such control signals of the control surfaces the delay elements ensure that the threshold value of the elements having a threshold value will not yet be exceeded.

The indicator lamps may be supplied through a blinking switch so that the indication is effected in the form of a blinking signal which is hard to overlook.

The arrangement, according to the invention, comprising four lamps of which two respective ones are energized simultaneously, has another essential advantage: an indication would still be obtained, if one of the lamps failed to operate.

DESCRIPTION OF SPECIFIC EMBODIMENTS

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

Figure 1:
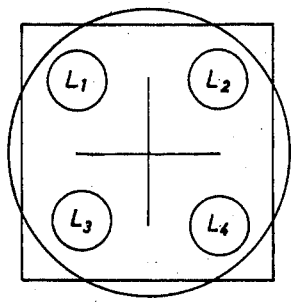
FIG. 1 is a front view of the trim indicator according to this invention.

FIG. 1 illustrates visual display apparatus in which four indicator lamps or lights L1, L2, L3 and L4 are arranged in the corners of a square. With a directional mistrimming towards the right in FIG. 1, the lamps L2 and L4 light up. With a directional mistrimming towards the left, the lamps L1 and L3 light up. With a pitch mistrimming, either the lamps L1 and L2 or the lamps L3 and L4 light up together. With a directional and pitch mistrimming, a total of three lamps light up, and that is, for instance, the lamps L1, L2 and L4. Lighting up of the lamps only takes place in the case of a constant deflection of the control surfaces continuing for longer than a predetermined period of time. In response to temporary deflections of the control surfaces which serve for the dynamic attitude stabilization, the lamps will not be lighted.

Figure 2:
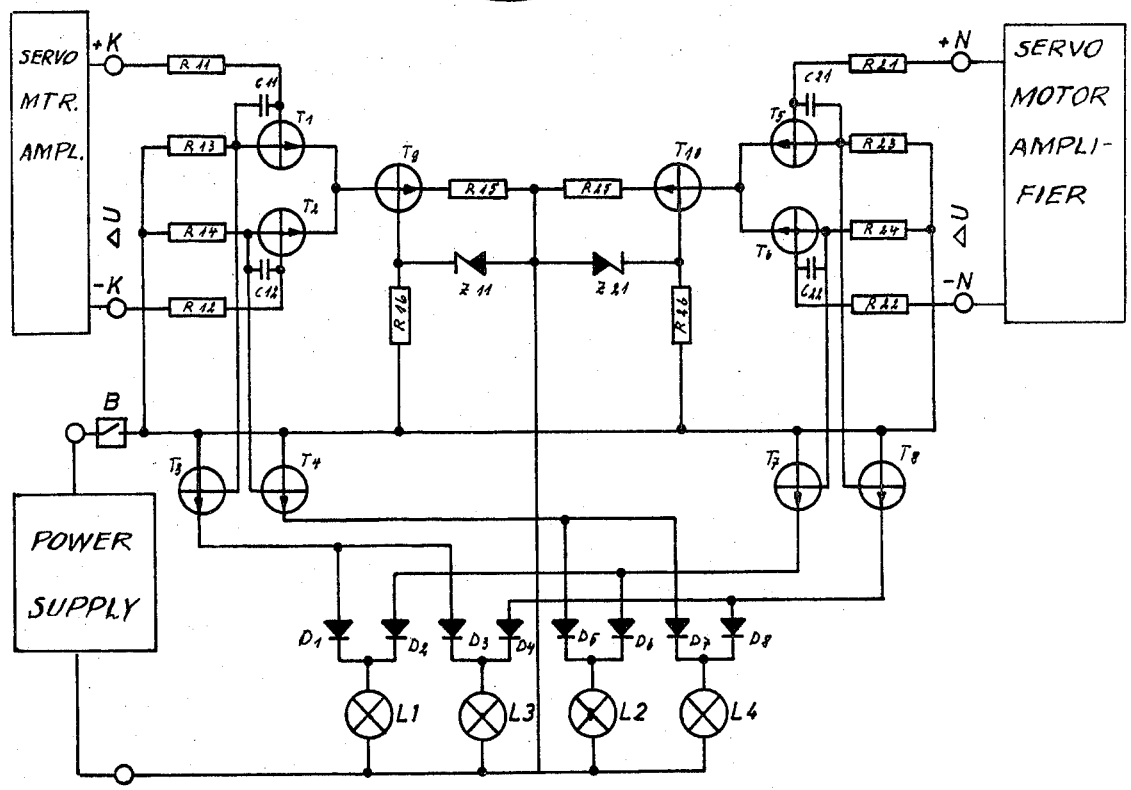
FIG. 2 illustrates the electrical circuit thereof.

The electrical circuit, as illustrated in FIG. 2, comprises two differential amplifiers. One differential amplifier includes the transistors T1, T2 having collector resistors R13 and R14. These transistors and resistors are in the form of a bridge with a constant current being supplied to one diagonal of the bridge. This current is maintained constant by a transistor T9, having an emitter resistor R15 and a voltage divider including a resistor R16 and a Zener diode Z11. The other two corners of the bridge (defining the other diagonal) are used as pickoff point for the voltage signals to actuate the lamps. Correctional signals ($\Delta U$) from the power amplifiers to the directional servomotors are applied at the terminals +K, −K. These signals are applied to the transistors T1 and T2 through resistors R11 and R12 to actuate the transistors T1 and T2. Each of transistors T1 and T2 has a capacitor (C11 and C12 respectively) connected between its base and collector to serve as a delay element so that the servomotor correctional signals will not be passed along immediately.

Similarly, a differential amplifier stage is provided for the pitch channel. Transistors T5 and T6 and their collector resistors R23 and R24 are in the form of a bridge. Across one diagonal of the bridge, transistors T5 and T6 are supplied by a source of constant current through transistor T10. The transistor T10 connects to the negative terminal of a supply voltage source through an emitter resistor R25. A constant voltage is applied to its base through a voltage divider comprised of a Zener diode Z21 and a resistor R26. The transistors T5 and T6 are actuated by correctional signals from the power amplifier for the servomotors of the pitch channel received at the terminals +N and −N. These correctional signals are applied through resistors R21 and R22. Delay elements in the form of capacitors C21 and C22 are connected between the base and collector of the transistors T5 and T6.

The output voltages of the differential stages which are derived at the diagonals of the bridges constituted by the transistors and their collector resistors are applied to one of four trigger stages, each stage having a transistor T3 and T4, and T7 and T8, respectively. Each trigger stage acts as a switch to provide a closed circuit when the voltage applied thereto from the bridge exceeds a pre-established threshold value. Otherwise, an open circuit exists across the transistor and in the circuit from the power supply through the lamps. The threshold value required to activate is attained if a voltage difference of a magnitude of at least Δ U-directional and Δ U-pitch, respectively, is applied to the differential amplifier stages for a sufficient period of time and the capacitors are charged accordingly.

The trigger stages T3, T4 and T7, T8 energize the four lamps L1, L2, L3 and L4 through a diode logic comprising the diodes D1 – D8. Specifically: the transistor T3 connects to L1 through D1 and to L3 through D3; the transistor T4 connects to L2 through D5 and to L4 through D7; the transistor T7 connects to L1 through D2 and to L2 through D6; and the transistor T8 connects to L3 through D4 and to L4 through D8. It can thus be seen that, for instance, with a directional mistrimming of a specific polarity the transistor T3 becomes conductive and causes the lamps L1 and L3 to light up. If a pitch mistrimming is additionally involved by which, say, a connection is made through the transistor T7, the lamps L1 (which is already lighted) and the lamp L2 are additionally switched on.

The supply voltage (at least to the lights) is applied through a blinking relay B so that the lamp indication is effected in the form of a blinking signal.

I CLAIM:

1. An apparatus for use with an automatic pilot for indicating the existence of a correctional signal issued by the automatic pilot, said apparatus including:
   a visual indicator comprising four lights, said lights being positioned at the corners of a rectangle having two ends and two sides, said two sides appearing to be a top and bottom, said two ends appearing to be vertical;
   an electrical control device including diode logic means connected to said indicator for operating the lights in response to the existence of correctional signals, said control device being connected to said indicator so that the lights at one of the two ends are lighted with the existence of a pitch correctional signal, and that the lights at one of the two sides are lighted with the existence of a directional correctional signal; and
   connections for receiving said correctional signals from the automatic pilot, delay and threshold means between said connections and said lights to require that the correctional signals be greater than a predetermined minimum before the lights will be lighted and then only after said signals have existed for a predetermined length of time.

2. An apparatus as set forth in claim 1, wherein said control device includes means for blinking the lighted lamps.

* * * * *

UNITED STATES PATENT OFFICE
CERTIFICATE OF CORRECTION

Patent No. 3,676,843                    Dated  July 11, 1972

Inventor(s)   Karlhans Schwarz

It is certified that error appears in the above-identified patent and that said Letters Patent are hereby corrected as shown below:

| | |
|---|---|
| Inventor's name | "Schwartz" should be --Schwarz--. |
| Assignee's name | "Gergtetechnik" should be --Geratetechnik--. |
| Abstract, line 4 | "face" should be --fact--. |
| Column 3, line 29 | "lamps" should be --lamp--. |

Signed and sealed this 16th day of July 1974.

(SEAL)
Attest:

McCOY M. GIBSON, JR.                    C. MARSHALL DANN
Attesting Officer                        Commissioner of Patents